(12) United States Patent
Steenson

(10) Patent No.: US 8,424,158 B2
(45) Date of Patent: Apr. 23, 2013

(54) THREE-STATE CASTER ASSEMBLY WITH SWIVEL LOCK AND WHEEL BRAKE

(76) Inventor: Adrian Steenson, Mississauga (CA)

( * ) Notice: Subject to any disclaimer, the term of this patent is extended or adjusted under 35 U.S.C. 154(b) by 0 days.

(21) Appl. No.: 13/135,872

(22) Filed: Jul. 18, 2011

(65) Prior Publication Data
US 2012/0054983 A1  Mar. 8, 2012

Related U.S. Application Data

(60) Provisional application No. 61/344,644, filed on Sep. 7, 2010.

(51) Int. Cl.
*B60B 33/00* (2006.01)
(52) U.S. Cl.
USPC .......................................................... 16/35 R
(58) Field of Classification Search .............. 16/35 R, 16/35 D, 37, 38; 188/1.12, 24.21, 24.22, 188/24.12, 24.13, 24.16, 24.19, 20; 5/86.1, 5/600, 620; 280/87.042, 79.11, 47.11, 428, 280/651, 652, 658
See application file for complete search history.

(56) References Cited

U.S. PATENT DOCUMENTS

| | | | | |
|---|---|---|---|---|
| 4,035,864 A | * | 7/1977 | Schroder | 16/35 R |
| 4,205,413 A | * | 6/1980 | Collignon et al. | 16/35 D |
| 4,349,937 A | * | 9/1982 | Fontana | 16/35 R |
| 4,706,328 A | * | 11/1987 | Broeske | 16/35 R |
| 4,835,815 A | * | 6/1989 | Mellwig et al. | 16/35 R |
| 6,810,560 B1 | * | 11/2004 | Tsai | 16/35 R |
| 6,834,746 B1 | * | 12/2004 | Lin | 188/1.12 |
| 7,926,145 B2 | * | 4/2011 | Liao | 16/35 R |
| 2009/0019670 A1 | * | 1/2009 | Tsai | 16/35 R |

FOREIGN PATENT DOCUMENTS

| JP | 11321208 A | * | 11/1999 |
|---|---|---|---|
| JP | 2001191709 A | * | 7/2001 |

* cited by examiner

*Primary Examiner* — Chuck Y. Mah
(74) *Attorney, Agent, or Firm* — Riches, McKenzie & Herbert LLP

(57) ABSTRACT

A caster assembly is provided which may include an attachment means for attaching the caster assembly to a base of an object, a caster yoke, and a cam assembly operable in at least three states. The caster yoke is operable to swivel relative to the attachment means. The cam assembly may include an actuating means for operating the cam assembly, a swivel lever mechanism and a brake lever mechanism in communication with a cam. When in a first state, the wheel rotates freely and the caster yoke swivels freely. When in a second state, a first swivel brake is engaged by the swivel lever mechanism to lock the caster yoke in a predetermined orientation while the wheel is allowed to rotate freely. When in a third state, a wheel brake is engaged by the brake lever mechanism to stop the wheel from rotating freely and a second swivel brake is simultaneously engaged to stop the caster yoke from swivelling.

21 Claims, 15 Drawing Sheets

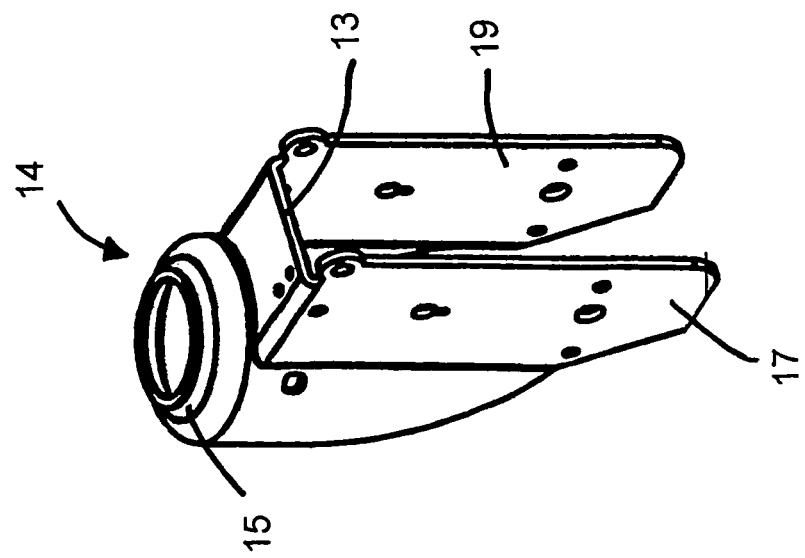
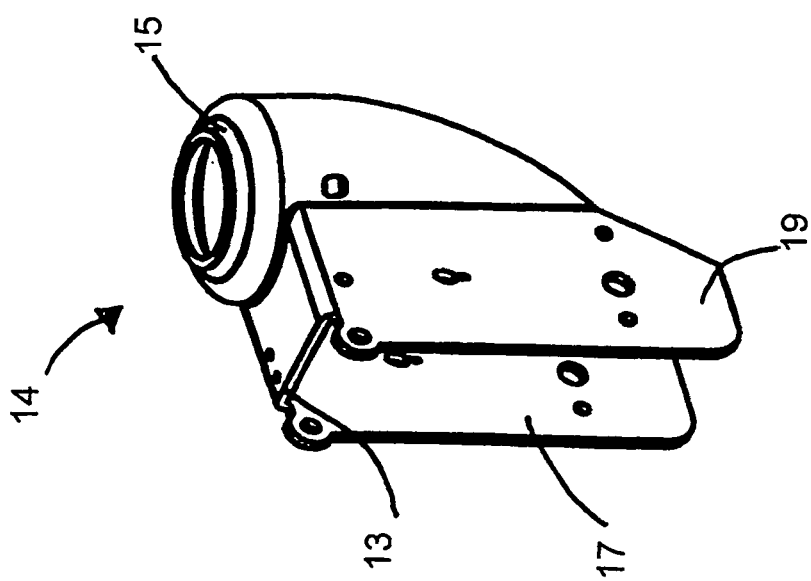
Fig. 2B
Fig. 2A

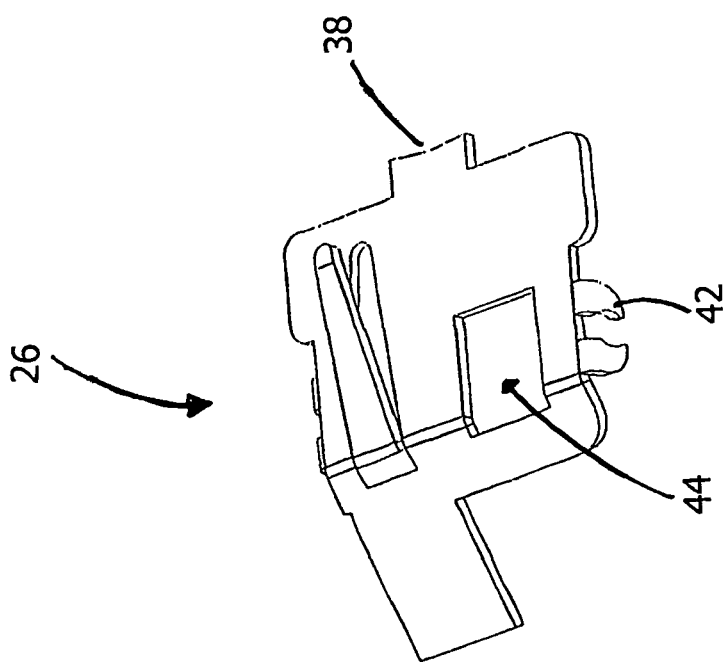
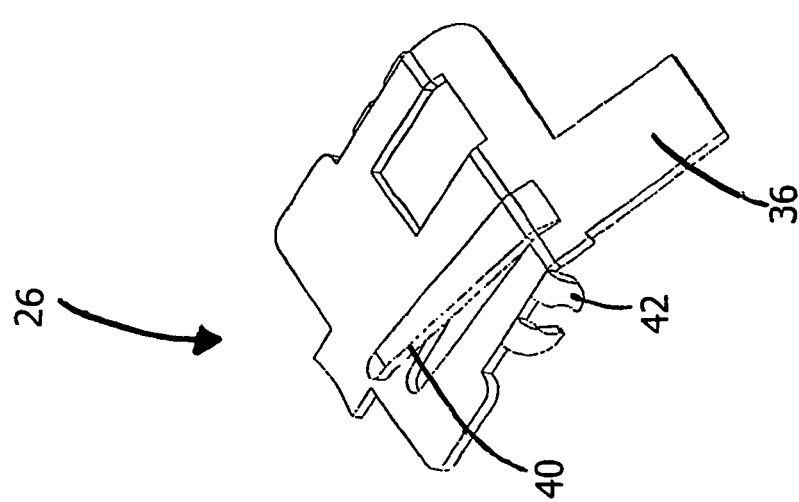
Fig. 3B
Fig. 3A

THREE-STATE CASTER ASSEMBLY WITH SWIVEL LOCK AND WHEEL BRAKE

CROSS REFERENCE TO RELATED APPLICATIONS

This invention relates to U.S. Provisional Application No. 61/344,644, filed Sep. 7, 2010, the contents of which are hereby incorporated by reference in its entirety.

FIELD OF THE INVENTION

This invention relates to a caster assembly, and more particular a caster assembly having a wheel brake and a swivel lock.

BACKGROUND OF THE INVENTION

Caster assemblies are generally well known in the art. Casters are attached to a base or the bottom of an object such as beds, chairs, palettes, wagons, carts and the like, to provide translation of the object along a surface or the ground. When attached to an object, one or more caster assemblies allow the object to be rolled.

In some configurations, the wheel of the caster assembly is fixed in a single orientation relative to the attached object to provide motion in a single forward and backward direction. In other configurations, the caster assembly includes a swivel that allows the caster assembly to rotate about a vertical axis. If all casters attached to the object are of this configuration, the object to which the caster is attached is able to move in a lateral as well as a forward and backward motion. Furthermore, providing all caster assemblies with a swivel feature allows the object to turn quickly with little to no turning radius about any vertical axis. Different configurations are also well known with combinations of fixed and swivel-enabled caster assemblies attached to a single object.

Wheel brake and swivel brake assemblies for casters are also well known and have been provided in a variety of configurations for many years. A wheel brake assembly is used to stop the motion of the wheel such that the wheel is not longer able to rotate about a respective wheel axis. Wheel brake assemblies are often engaged when a user wishes the object to remain in a fixed position. If the caster has a swivel, the object may still be able to rotate about the wheel-braked caster even though the wheel itself is not able to rotate.

Similarly, swivel brake assemblies have been designed to lock a swivel-enabled caster in a fixed orientation such that the caster is unable to swivel about the vertical axis. Swivel brake assemblies are commonly used when a user wishes to translate the object in a fixed direction, such as forward or backwards relative to the object, without having to exert the additional effort to steer. As only the swivel has been affected, the wheel of the caster is still free to rotate about the wheel axis. Furthermore, objects having fixed caster assemblies oriented in the same direction will generally travel in a straight line.

Finally, a combination of wheel brake and swivel brake are known to simultaneous engage a wheel brake and a swivel brake using a single stopping mechanism. With a single action, the user is able to both stop the rotation of the caster's wheel about the wheel axis and stop the rotation of the swivel about the vertical axis. The combination of both a wheel brake and a swivel brake provides the best opportunity to stop any motion of the object. When both the wheel brake and the swivel brake are engaged, the caster assembly behaves as a footing and any motion of the object must overcome the friction between the wheel of the caster assembly and the ground.

While the various types and combinations of wheel and swivel brake assemblies are generally known in the art, each type of device requires a different type of locking mechanism and a separate and distinct engagement mechanism. Furthermore, it may not be possible to incorporate more than one braking mechanism in a single caster, as the space and engagement requirements of an individual braking mechanism may preclude additional breaking mechanisms to be included into the caster.

Accordingly, there is a need for a caster assembly incorporating and engaging a plurality of wheel and brake assemblies, in various combinations, in an easy to use manner. Furthermore, there is a need to provide an indicator to easily identify which type of braking mechanism, if any, is engaged.

SUMMARY OF THE INVENTION

It is an object of this invention to overcome at least some of the deficiencies in the prior art. For example, the present invention provides a caster assembly that allows a single actuator mechanism or actuating means to switch between different modes of operation.

More specifically, the present invention is directed to a caster assembly capable of incorporating at least two different wheel and swivel brake assemblies, in different combinations, within a single caster assembly. The caster assembly is operated by a single actuating means, pedal or engagement mechanism that allows the caster assembly to switch between the different braking states.

As at least two swivel and braking mechanisms are incorporated into the caster assembly, the caster assembly is operable in at least three states. In a first state, no breaking mechanism is engaged and the wheel of the caster assembly is able to rotate freely about a wheel axis and the caster yoke is able to swivel or rotate freely relative to an attachment means, which is used to attach the caster assembly to a base of an object. In a second state, a swivel lock will be enabled while the wheel of the caster assembly is able to rotate freely. In the third state, both the wheel and the swivel are locked.

In a preferred embodiment, the caster assembly utilizes a foot pedal configured to rotate a cam to actuate the wheel brake and swivel lock in the different combinations. Each time a user pushes the foot pedal, the cam is rotated 60 degrees or another pre-determined amount to change the function of the caster assembly. In the first position, both the wheel and the swivel rotate freely. In the second position, the swivel of the caster will be locked and the caster yoke will be in a fixed orientation relative to the attachment means. The wheel is still allowed to rotate. In the third position, both the swivel and the wheel are locked.

In one aspect, the present invention resides in a caster assembly. The caster assembly may include an attachment means for attaching the caster assembly to a base of an object, a caster yoke coupled to the attachment means, and a cam assembly operable in at least three states. The caster yoke is operable to swivel relative to the attachment means. The caster yoke is coupled to a wheel operable to rotate freely about a wheel axle. The cam assembly may include an actuating means, such as a pedal, for operating the cam assembly, a cam in mechanical communication with the actuating means, a swivel lever mechanism in mechanical communication with the cam, and a brake lever mechanism in mechanical communication with the cam. When the cam assembly is in a first state, the wheel is operable to rotate freely about the wheel axis and the caster yoke is operable to swivel freely relative to the attachment means. When the cam assembly is in a second state, the cam disposes the swivel lever mechanism such that a first swivel brake is engaged to lock the caster yoke in a predetermined orientation relative to the attachment means while the wheel is allowed to rotate freely. When the cam assembly is in a third state, the cam disposes the brake lever mechanism such that, simultaneously, a wheel brake is engaged to stop the wheel from rotating freely about the wheel axis and a second swivel brake is engaged to stop the caster yoke from swivelling relative to the attachment means.

In a preferred embodiment, the attachment means may include a top plate. The top plate may include a number of apertures to attach the caster assembly to the base of the object. In another preferred embodiment, the attachment means may include a stem bolt. The stem bolt may be used to attach the caster assembly to the base of the object using a stem bolt nut.

In another preferred embodiment, a caster system may comprise a plurality of caster assemblies. For example, four caster assemblies in accordance with the present invention may be attached to the base of an object, such as a medical cart. Each caster assembly may be operable by a separate pedal. In an alternative embodiment, a single actuator may be used to operate the actuating means of each of the plurality of caster assemblies in a single action, such as the press of a pedal or button.

Further and other features of the invention will be apparent to those skilled in the art from the following detailed description of the embodiments thereof.

BRIEF DESCRIPTION OF THE DRAWINGS

Reference may now be had to the following detailed description taken together with the accompanying drawings in which:

FIG. 2A and FIG. 2B show isometric views of a caster yoke in accordance with an embodiment of the present invention;

FIG. 3A and FIG. 3B show isometric views of a swivel lever mechanism in accordance with an embodiment of the present invention;

DETAILED DESCRIPTION OF THE PREFERRED EMBODIMENTS

Figure 1A:
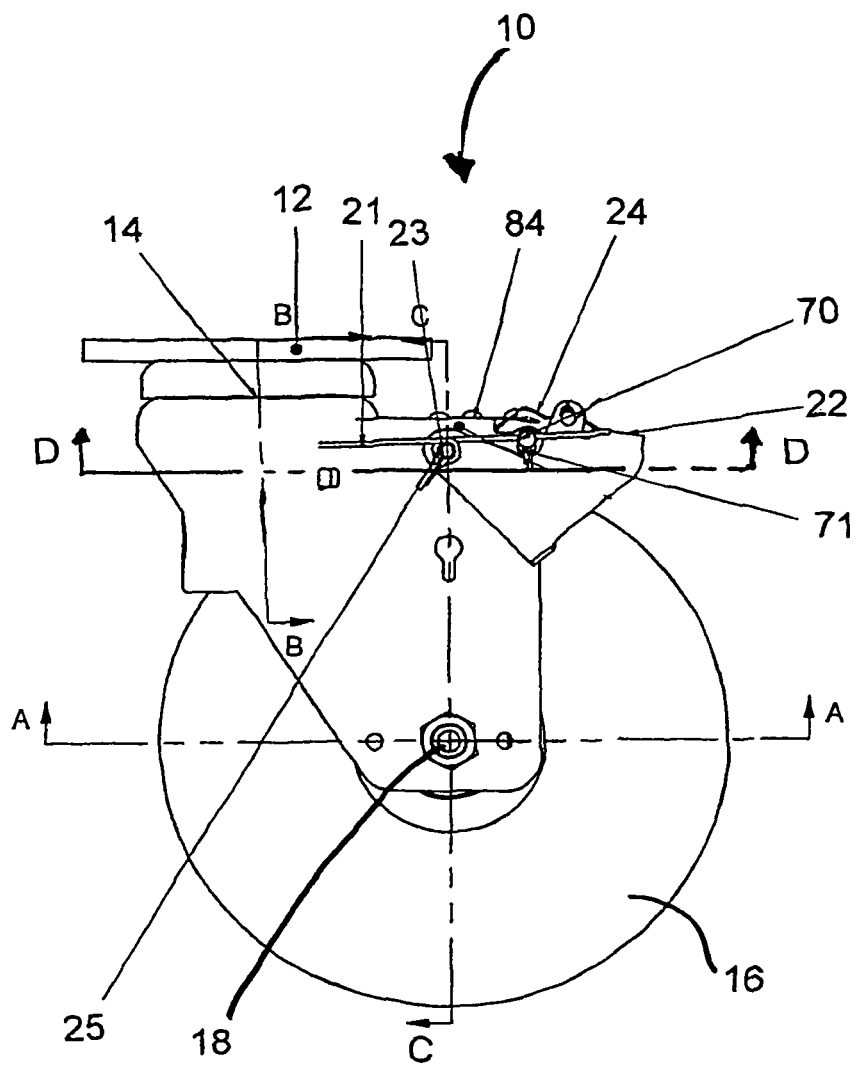
FIG. 1A shows a side view of a caster assembly in accordance with an embodiment of the present invention.
Figure 1B:
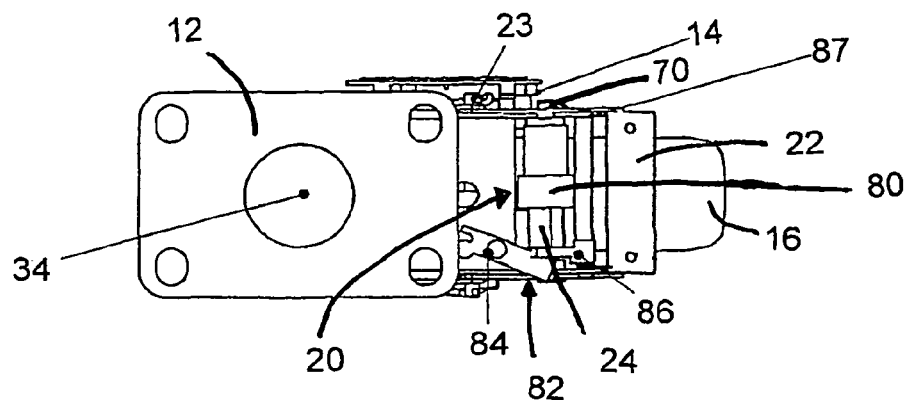
FIG. 1B shows a top view of the caster assembly shown in FIG. 1A.

A caster assembly 10 in accordance with an embodiment of the present invention is shown generally in different views in FIG. 1A and FIG. 1B. The caster assembly 10 includes an attachment means 12, a caster yoke 14, and a wheel 16 operable to rotate freely about a wheel axle 18. In a preferred embodiment, the attachment means 12 may include a top plate (hereinafter described as top plate 12).

The top plate 12 may be configured with a number of apertures to attach the caster assembly 10 to the base of an object (not shown). For example, the top plate 12 may connect the caster assembly 10 to a hospital bed or a medical cart. In a preferred embodiment, screws and/or nuts and bolts (not shown) may be used, although other methods of attaching the top plate 12 to the base of the object may also be implemented. Other objects are also possible, such as connecting the top plate 12 to the base of a chair, a cart, a wheel, a palette and the like.

The caster yoke 14 is mechanically coupled to the top plate 12. Furthermore, the caster yoke 14 is operable to swivel about a vertical axis relative the top plate 12. In some embodiments, a king bolt 34 may be used. The king bolt 34 may be affixed to the top plate 12 with one or more bearings 35 (referring briefly to FIG. 1E) incorporated into the caster assembly 10 to allow the caster yoke 14 to rotate about a vertical axis defined by the king bolt 34 fixed to the top plate 12. In operation with the top plate 12 fixed to base of an object, the caster yoke 14 and wheel 16 are free to pivot about the vertical axis to increase the maneuverability of the object supported by a plurality of the caster assemblies 10.

The wheel axle 18 is coupled to the caster yoke 14 and allows the wheel 16 to rotate about the horizontal axis of the wheel axle 18. Furthermore, the wheel axle 18 is offset from the vertical swivel axis defined by the king bolt 34. This lateral offset encourages the caster assembly 10 to swivel about the vertical axis when a force (not shown) is applied to the object such that the rotation of the wheel 16 is also aligned with the force applied to the object.

As further described below, the caster assembly 10 also includes a cam assembly 20 which is operable to shift the caster assembly 10 into different states or modes of operation. The cam assembly 20 is provided for operating the caster assembly 10 in at least three states of operation. In the first state, both the wheel and the caster yoke are in unlocked positions. The wheel 16 is free to rotate about the wheel axis 18 and the caster yoke 14 is free to swivel with respect to the top plate 12. In this state, the cam assembly 20 does not impede the movement of either the wheel or the swivel of the caster yoke 14 relative to the top plate 12. In a second state, the wheel 16 is still operable to rotate about the wheel axle 18, but the caster yoke 14 is locked in a pre-determined orientation relative to the top plate 12. For example, the caster yoke 14 may be locked such that the object attached to the caster assembly 10 is only able to roll in a forward or backward direction. A swivel lever mechanism 26 is engaged by the cam assembly 20 to lock the caster 14 in the pre-determined orientation, with the wheel 16 still free to rotate about the wheel axis 18. Finally, in a third state, the wheel 16 of the caster assembly 10 is locked, preventing rotation of the wheel 16 in either direction. Furthermore, the caster yoke 14 is simultaneously prevented from swivelling relative to the top plate 12. A brake lever mechanism 30 is engaged by the cam assembly 20 to simultaneously stop the rotation of the wheel 16 and to prevent the caster yoke 14 from swivelling.

Referring now to FIG. 2A and FIG. 2B, the caster yoke 14 is constructed with a base plate 13 and an annular depending flange 15 connected to a pair of parallel side legs 17, 19. The caster yoke 14 may be formed from sheet metal, and in some embodiments, a single piece of sheet metal. The annular depending flange 15 is configured to couple with the top plate 12. The lower ends of the legs 17, 19 have apertures that receive the wheel axle 18. Furthermore, the caster yoke 14 is provided with apertures and/or openings to connect the caster yoke 14 to other components of the caster assembly 10.

Figure 1C:
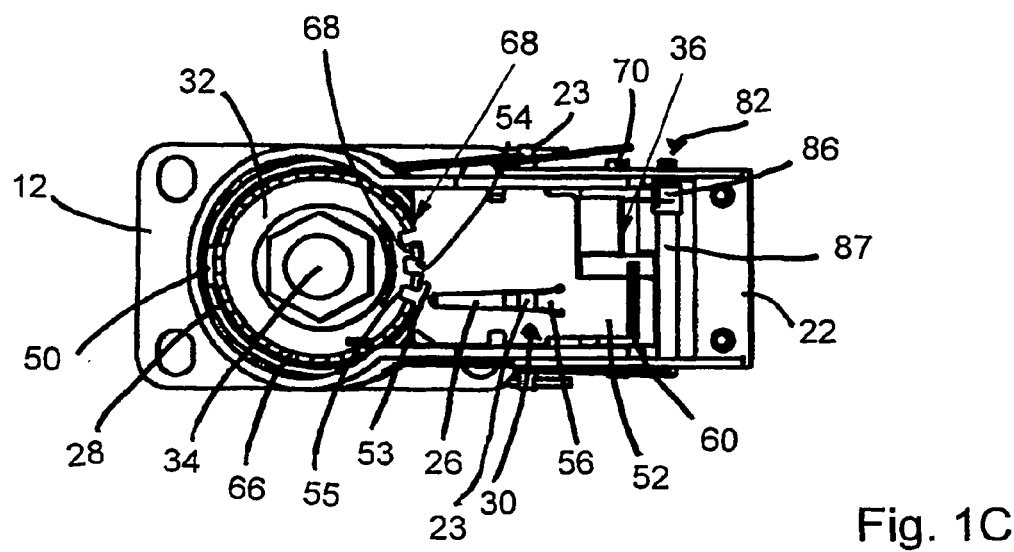
FIG. 1C shows a section view of the caster assembly shown in FIG. 1A along section line D-D.
Figure 1D:
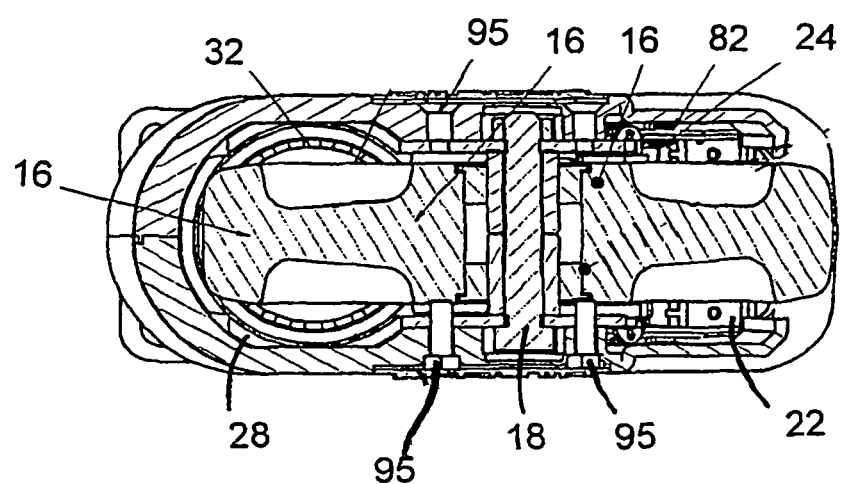
FIG. 1D shows a section view of the caster assembly shown in FIG. 1A along section line A-A.
Figure 1F:
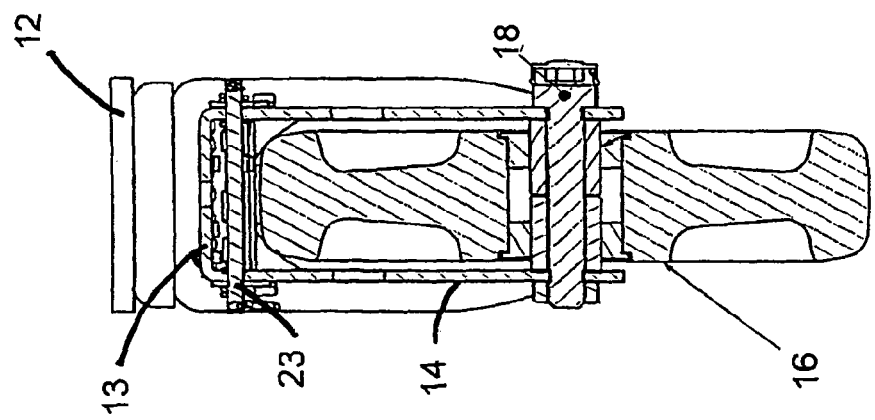
FIG. 1F shows a section view of the caster assembly shown in FIG. 1A along section line C-C.
Figure 1E:
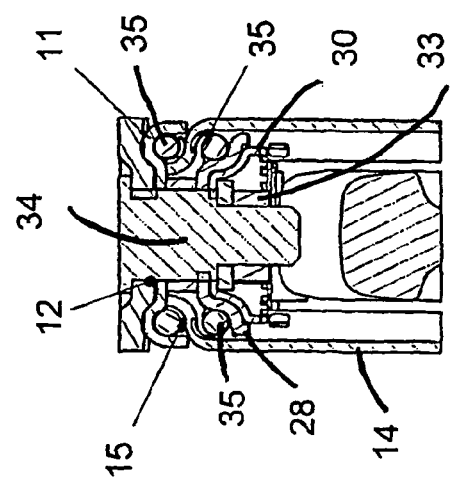
FIG. 1E shows a section view of the caster assembly shown in FIG. 1A along section line B-B.

With reference now to FIG. 1A to FIG. 1F, the individual components of the caster assembly 10 are described in relation to their respective placement and function within the caster assembly 10. FIG. 1C is a bottom view of the caster assembly 10 seen in FIG. 1A along cut-line D-D. In particular, FIG. 1C shows an underside of the cam assembly 20. FIG. 1D is a section view of the caster assembly 10 along cut-line A-A. FIG. 1E is a section view of the caster assembly 10 along cut-line B-B. Finally, FIG. 1F is a section view of the caster assembly 10 along cut-line C-C.

In FIG. 1E, the top plate 12 is coupled to the caster yoke 14 by a king bolt 34. The king bolt 34 is configured to pass through an aperture in the top plate 12 and the annular depending flange 15 of the caster yoke 14. The king bolt 34 holds the top plate 12 and the caster yoke 14 together with a king bolt nut 33. To allow the caster yoke 14 to swivel relative to the top plate 12, bearings 35 are used. Two sets of bearings 35 may be incorporated into the caster assembly 10. Bearings 35 may be placed between a top plate washer 11 adjacent the top plate 12 and the outside of the annular depending flange 15 of the caster yoke 14. Furthermore, a set of bearings 35 may be placed between the inside of the annular depending flange 15 and the outside of a swivel lock retainer 28, which is coupled to the top plate 12 via the king bolt 34. In a preferred embodiment, a brake swivel retainer 32 is configured to sit on the inside the swivel lock retainer 28, also coupled to the top plate 12 via the king bolt 34 and king bolt nut 33.

The ball bearings 35 allow the caster yoke 14 to swivel relative to the top plate 12, while providing strong coupling and support to the caster assembly 10. In operation, the top plate washer 11, swivel lock retainer 28 and brake swivel retainer 32 are fixed relative to the top plate 12 by the king bolt 34 and king bolt nut 33. The king bolt 34 may be shaped to prevent the top plate 12, the swivel lock retainer 28 and the brake swivel retainer 32 from rotating about the king bolt 34 when fixed to the top plate 12. For example, the king bolt 34 may have different portions. For example, a face may be cut into a portion of the king bolt 34 to match a corresponding aperture shape of the top plate 12, the swivel lock retainer 28 (seen in FIG. 4A and FIG. 4B) and the brake swivel retainer 32 (seen in FIG. 6A and FIG. 6B). This may also allow the swivel lock retainer 28 and the brake swivel retainer 32 to be aligned with the top plate 12. Furthermore, as shown in FIG. 1E, the brake swivel retainer 32 is stacked inside the swivel lock retainer 28 and locked in place by the king bolt nut 33. The king bolt nut 33 may be operable to mate with a different portion of the king bolt 34.

Referring briefly to FIG. 1A to FIG. 1C, the cam assembly 20 includes an actuating means 22, a cam 24, a swivel lever mechanism 26, a brake lever mechanism 30 and a common axle 23. In different states, the cam assembly 20 is operable to apply a brake to one or both of the wheel 16 and the swivel of the caster yoke 14 relative to the top plate 12. In a preferred embodiment, the actuating means 22 is a pedal (hereinafter referred to as pedal 22). However, it should be understood that other actuating means are possible. For example, a knob, a dial, or an electromechanical device, such as a solenoid, may be used as the actuating means 22.

As illustrated in FIG. 1A to FIG. 1C, the pedal 22, the swivel lever mechanism 26 and the brake lever mechanism 30 rotate about the common axle 23 coupled to the caster yoke 14. A common axle cotton pin 25 (as seen in FIG. 1A) may be used to hold the common axle 23 in position relative to the caster yoke 14.

Referring now to FIG. 3A and FIG. 3B, the swivel lever mechanism 26 is seen in opposing side views. The swivel lever mechanism 26 includes a swivel cam follower 36 generally disposed towards an end of the swivel lever mechanism 26 in communication with the cam 24 and a first swivel brake 38, at the opposing end as the swivel cam follower 36. Referring briefly to FIG. 1B and FIG. 1C, the swivel cam follower 36 is installed into the caster yoke 14 underneath the cam 24, in a direction away from the king bolt 34; whereas the first swivel brake 38 is disposed towards the king bolt 34 and the swivel lock retainer 28. The swivel lever mechanism 26 also includes a swivel spring finger 40, a pair of swivel lever pivots 42 and an access aperture 44.

The swivel lever mechanism 26 is connected to the caster yoke 14 through the pair of swivel lever pivots 42. In a preferred embodiment, the common axle 23 is passed through the caster yoke 14 and the pair of swivel lever pivots 42. As illustrated in FIG. 3A and FIG. 3B, the pair of swivel lever pivots 42 is generally disposed under a plane defined by the swivel lever mechanism 26. When coupled to the caster yoke 14 through the pair of swivel lever pivots 42, the swivel lever mechanism 26 rotates about the swivel lever pivots 42 and the common axle 23. When the swivel cam follower 36 tracks the cam 24, the swivel brake 38 is also engaged.

To maintain contact between the swivel cam follower 36 and the cam 24, the swivel spring finger 40 is configured to be in mechanical contact with an underside of the caster yoke 14. For example, the swivel spring finger 40 may be in contact with an underside of the base plate 13 of the caster yoke 14. By pressing the swivel spring finger 40 against the base plate 13, the swivel cam follower 36 of the swivel lever mechanism 26 is pivoted about the common axle 23 and is biased against the cam 24. In this manner, the swivel cam follower 36 is able to track the shape of the cam 24.

Figure 4B:
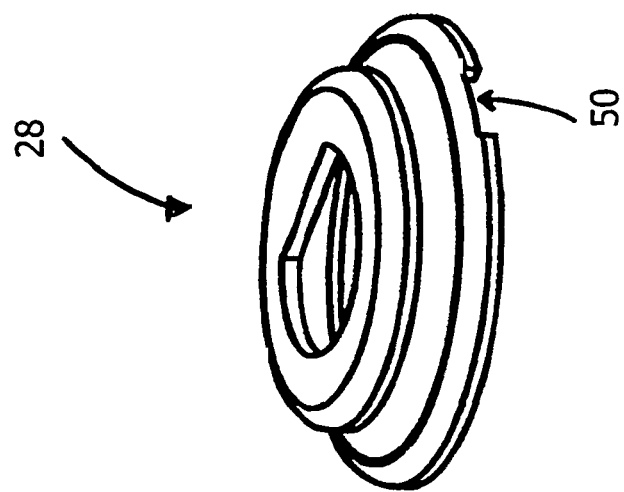
FIG. 4A and FIG. 4B show isometric views of a swivel lock retainer in accordance with an embodiment of the present invention.
Figure 4A:
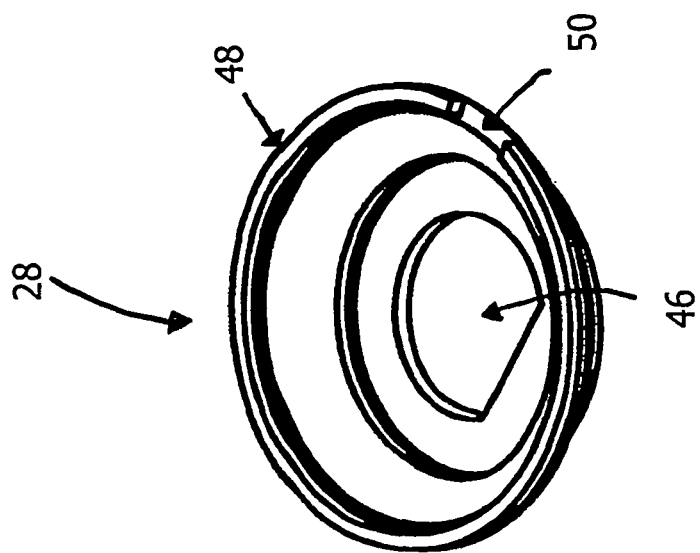

The swivel lever mechanism 26 is configured to be complementary with the swivel lock retainer 28. Referring now to FIG. 4A and FIG. 4B, a top isometric view and a bottom isometric view of a swivel lock retainer 28 is illustrated. As previously discussed, the swivel lock retainer 28 is fixed to the top plate 12. The swivel lock retainer 28 is used to mate with the swivel brake 38 of the swivel lever mechanism 26 to prevent the caster yoke 14 from swivelling relative to the top plate 12.

The swivel lock retainer 28 is generally circular and includes a central king bolt aperture 46. The swivel lock retainer 28 is operable to be fixed to the top plate 12 by the king bolt 34 passing through the king bolt aperture 46. The shape of the king bolt aperture 46 is complementary to the king bolt 34 and may be shaped to prevent slippage of the swivel lock retainer 28 relative to the top plate 12. When fixed to the top plate 12, the swivel lock retainer 28 rotates about the vertical axis defined by the king bolt 34 when the top plate 12 is swivelled relative to the caster yoke 14.

The swivel lock retainer 28 has an outermost rim or flange called the swivel retainer lip 48. The swivel retainer lip 48 runs along the outside of the swivel lock retainer 28 and faces downward when fixed to the top plate 12 by the king bolt 34. The swivel retainer lip 48 is configured with one or more swivel brake gaps 50. The swivel brake gap 50 is constructed to mate with the swivel brake 38 of the swivel lever mechanism 26. When the swivel brake 38 is inserted into the swivel brake gap 50, the caster yoke 14 is prevented from swivelling relative to the top plate 12.

As seen in FIG. 4A and FIG. 4B, the swivel lock retainer 28 is configured with a single swivel brake gap 50. However, it should be understood that additional swivel brake gaps 50 may be used. With a single swivel brake gap 50, the swivel brake 38 of the swivel lever mechanism 26 will only engage the swivel brake gap 50 (and thus prevent the caster assembly 10 from swivelling), when the orientation of the swivel brake 38 and swivel brake gap 50 align. Accordingly, the swivel lock retainer 28 is constructed and installed such that the caster assembly 10 is only prevented from swivelling when the caster yoke 14 of the caster assembly 10 is in a pre-determined orientation defined by the swivel brake gap 50, such as moving forward and backward. It should be understood that the swivel brake retainer 28 may have more than one swivel brake gap 50 and that other pre-determined orientations, such as at right angles with respect to the top plate 12 or at 180 degrees, may be used.

In another preferred embodiment, when the swivel lever mechanism 26 is engaged by the cam 24 but the wheel 16 of the caster assembly 10 does not align with the pre-determined orientation defined by the swivel brake gap 50 such that the swivel brake 38 of the swivel lever mechanism 26 is inserted into the swivel brake gap 50, the caster yoke 14 is still able to swivel relative to the top plate 12. When the swivel lever mechanism 26 is engaged, the swivel brake 38 is biased against, and is operable to slide along, the swivel retainer lip 48. When the caster yoke 14 is ultimately aligned with the pre-determined orientation defined by the swivel brake gap 50, the swivel brake 38 of the swivel lever mechanism 26 drops into the swivel brake gap 50, thereby locking the caster yoke 14 relative to the top plate 12. Thus, when the swivel lever mechanism 26 is engaged by the cam assembly 20, the caster yoke 14 is still able to swivel relative to the top plate 12 until the caster yoke 14 (and the wheel) is aligned with the pre-determined orientation. Only then will the swivel brake 38 drop into the swivel brake gap 50, stopping the wheel 16 from swivelling about the vertical axis.

Figure 5B:
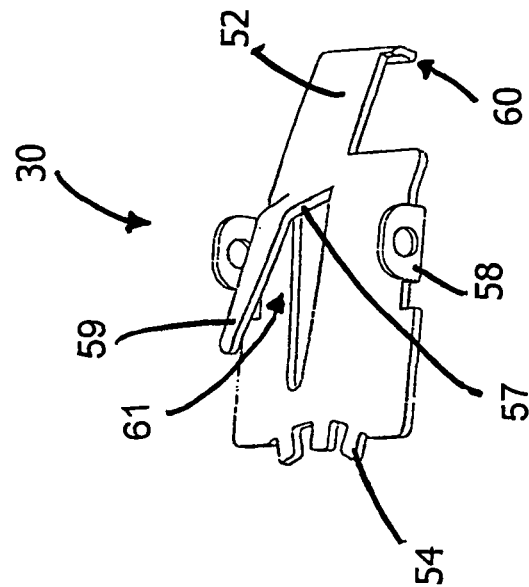
FIG. 5A and FIG. 5B show isometric views of a brake lever mechanism in accordance with an embodiment of the present invention.
Figure 5A:
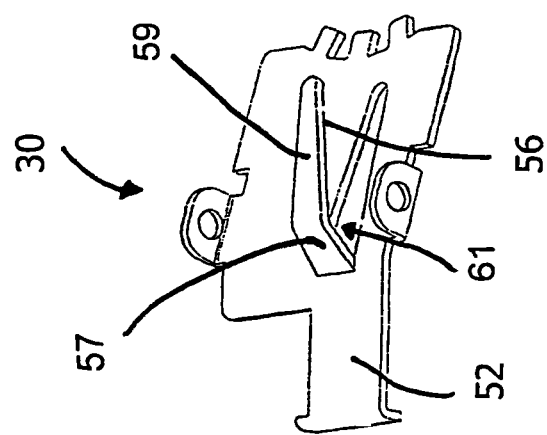

FIG. 5A and FIG. 5B show opposing side views of a brake lever mechanism 30. The brake lever mechanism 30 is configured in a similar manner to the swivel lever mechanism 26 seen in FIG. 3A and FIG. 3B. Like the swivel lever mechanism 26, the brake lever mechanism 30 includes a brake cam follower 52 disposed on one side of the brake lever mechanism 30 and a swivel brake 54 on the opposing side. Similarly, the brake lever mechanism 30 also includes a brake spring finger 56 and a pair of brake lever pivots 58.

In a preferred embodiment, the brake lever mechanism 30 is coupled to the caster yoke 14 by the pair of brake lever pivots 58 and the common axle 23. As shown in FIG. 5A and FIG. 5B, the pair of brake lever pivots is generally disposed above a plane defined by the brake lever mechanism 30. When the brake cam follower 52 tracks the cam 24, the brake lever mechanism 30 is operable to pivot about the pair of brake lever pivots 58 such that the swivel brake 54 prevents the caster yoke 14 from swivelling relative to the top plate 12.

To maintain contact between the brake cam follower 52 and the cam 24, the brake spring finger 56 is configured to be in mechanical contact with an underside of the caster yoke 14. For example, the brake spring finger 56 may be in contact with the same underside of the base plate 13 of the caster yoke 14 as the swivel spring finger 40. By pressing the brake spring finger 56 against the base plate 13, the brake cam follower 52 of the brake lever mechanism 30 is pivoted about the common axle 23 and is biased against the cam 24. In this manner, the brake cam follower 52 is able to track the shape of the cam 24.

As with the swivel spring finger 40 seen in FIG. 3A and FIG. 3B, the brake spring finger 56 may be constructed out of the swivel lever mechanism 26 and brake lever mechanism 30, respectively. The spring fingers 40, 56 may be shaped or bent out of the plane generally forming the lever mechanisms 26, 30.

Furthermore, the brake spring finger 56 may also be configured to have an upper portion 57 and an end portion 59. The upper portion 57 of the brake spring finger 56 may form an angle relative to the plane of the brake lever mechanism 30 larger than an angle formed between the end portion 59 relative to the plane of the brake lever mechanism 30. In this manner, a brake finger gap 61 is formed on the underside of the brake spring finger 56.

The brake lever mechanism 30 also includes a wheel brake 60. In the preferred embodiment illustrated in FIG. 5A and FIG. 5B, the wheel brake 60 is located at the end of the brake cam follower 52. When the brake cam follower 52 of the brake lever mechanism 30 tracks the cam 24 into a certain state, the wheel brake 60 is configured to prevent the wheel 16 from rotating freely about the wheel axle 18. For example, the wheel brake 60 may be pressed into the wheel 16 by the cam 24 to provide frictional resistance between the wheel brake 60 and the wheel 16, thus preventing the wheel 16 from rotating about the wheel axle 18.

To enable the wheel brake 60 to stop the rotation of the wheel 16, the wheel 16 is constructed of a resilient material such as a hard or soft plastic, rubber, or the like. The material of the wheel 16 may be constructed to provide shock absorption to the caster assembly 10 and is capable of being engaged by the wheel brake 60 without becoming damaged or deformed.

Figure 6B:
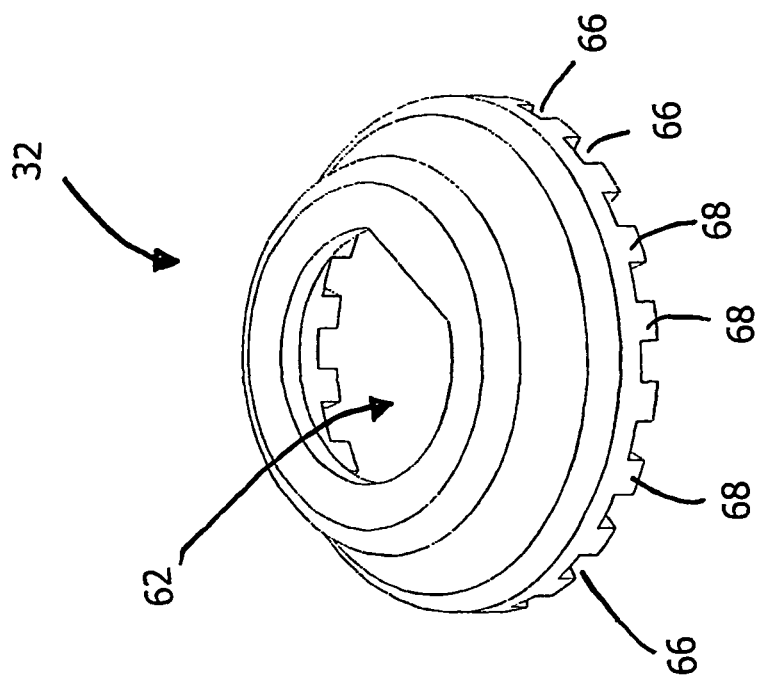
FIG. 6A and FIG. 6B show isometric views of a brake swivel retainer in accordance with an embodiment of the present invention.
Figure 6A:
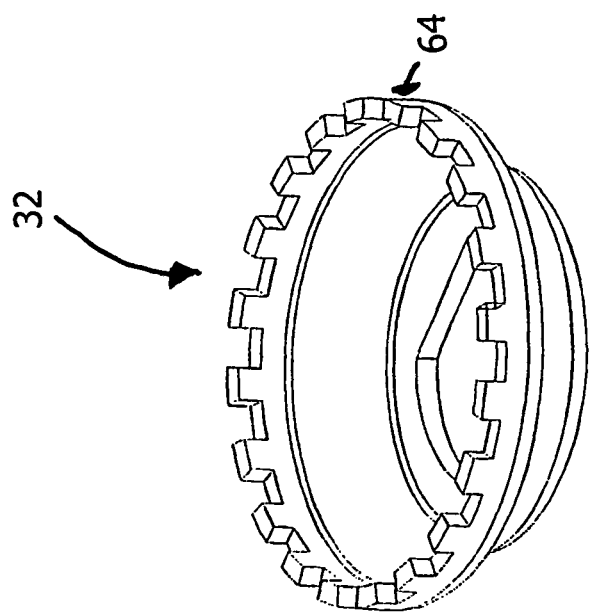

The brake lever mechanism 30 is complementary to a brake swivel retainer 32, which is fixed relative to the top plate 12 by the king bolt 34. Referring now to FIG. 6A and FIG. 6B, a top and bottom isometric view of a brake swivel retainer 32 for the brake lever mechanism 30 is illustrated. The brake swivel retainer 32 is used to mate with a swivel brake 54 of the brake lever mechanism 30 to prevent the caster yoke 14 from swivelling relative to the top plate 12. The swivel brake 54 of the brake lever mechanism 30 may include a plurality of swivel brake gaps 53 and swivel brake gears 55.

The brake swivel retainer 32 has an outermost rim or flange called the swivel retainer lip 64. The swivel retainer lip 64 of the brake lever mechanism 30 runs along the outside of the brake swivel retainer 32 and faces downward when fixed to the top plate 12 by the king bolt 34.

The brake swivel retainer 32 also includes a plurality of brake retainer gaps 66 and brake retainer gears 68 around the entire swivel retainer lip 64. Unlike the swivel lock retainer 28, the brake retainer gaps 66 of the brake swivel retainer 32 are numerous and equally spaced around the entire swivel retainer lip 64. In a preferred embodiment, the swivel brake 54 of the brake lever mechanism 30 is configured to interlock with the brake retainer gaps 66 and brake retainer gears 68 of the brake swivel retainer 32. As shown in FIG. 5A and FIG. 5B, the swivel brake 54 of the brake lever mechanism 30 is constructed with two swivel brake gaps 53 and three swivel brake gears 55. Each brake retainer gap 66 is configured to mate with a complementary swivel brake gear 55 of the swivel brake 54 and each brake retainer gear 68 is configured to mate with a complementary swivel brake gap 53. When the swivel brake 54 is mated with the brake swivel retainer 32, the caster yoke 14 is prevented from swivelling relative to the top plate 12.

As discussed previously in relation to FIG. 1E, the brake swivel retainer 32 is stacked inside the swivel lock retainer 28. Furthermore, both the stacked brake swivel retainer 32 and swivel lock retainer 28 are mechanically coupled to the top plate 12 by the king bolt 34 and king bolt nut 33. The swivel lock retainer 28 and brake swivel retainer 32 are configured such that their respective swivel retainer lips 48, 64 are accessible to cooperatively mate with the swivel brakes 38, 54 of the swivel lever mechanism 26 and brake lever mechanism 30, respectively and as seen in FIG. 1E. Although the brake swivel retainer 32 is shown stacked inside the swivel lock retainer 28, it should be understood that the swivel lock retainer 28 may be stacked inside the brake swivel retainer 32 in alternate embodiments.

Referring briefly to FIG. 1C, the brake lever mechanism 30 is shown installed within the caster yoke 14. The brake lever mechanism is pivoted about the common axle 23. The brake spring finger 56 is biased against the underside of the base plate 13 of the caster yoke 14 and the swivel brake 54 is engaged with the brake swivel retainer 32 to prevent the caster yoke 14 from swivelling relative to the top plate 12. Furthermore, although the bias from the cam 24 is not depicted, the cam 24 is biasing the brake cam follower 52 such that the swivel brake gaps 53 and swivel brake gears 55 of the brake lever mechanism 30 interlock with the brake retainer gears 68 and the brake retainer gaps 66 of the brake swivel retainer 32, respectively. Furthermore, as the brake cam follower 52 is biased by the cam 24, the wheel brake 60 is engaged to lock the wheel 16 from rotating freely about the wheel axle 18.

Figure 7:
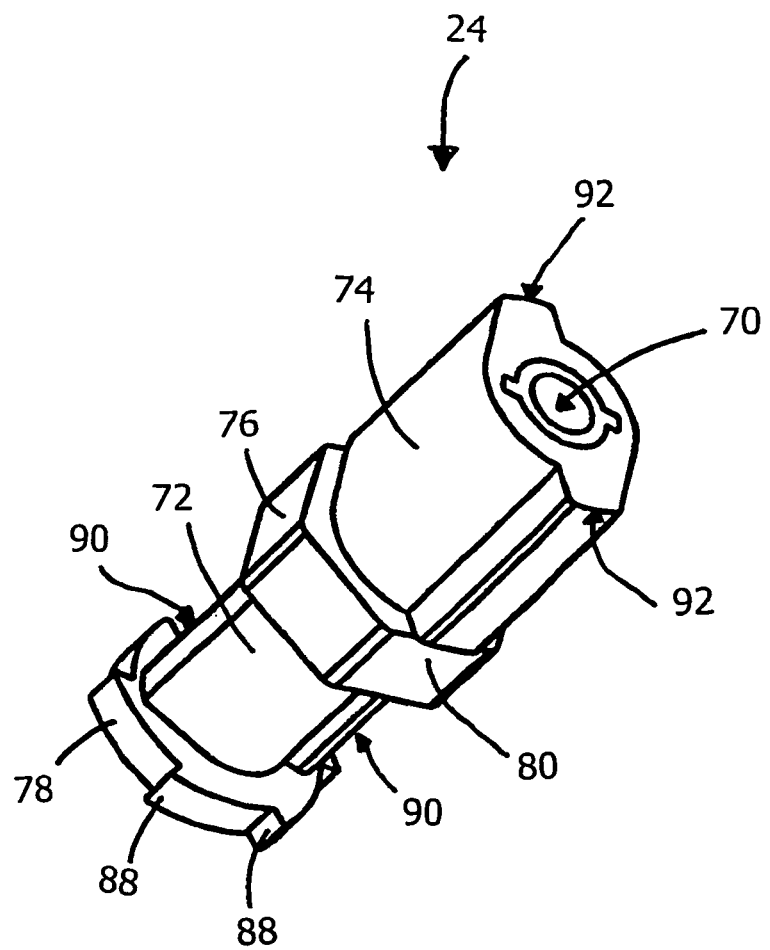
FIG. 7 shows an isometric view of a cam in accordance with an embodiment of the present invention.

Referring now to FIG. 7, a cam 24 is illustrated. The cam 24 rotates about a cam axle 70. The cam 24 is segmented into a plurality of different longitudinal cam portions 72, 74, 76, 78. Each cam portion 72, 74, 76, 78 is configured to control or be controlled by a different aspect of the cam assembly 20. A swivel cam portion 72 is configured for engaging the swivel lever mechanism 26. A brake cam portion 74 is configured for engaging the brake lever mechanism 30. An indicator portion is configured to provide an indicia 80 of which state the cam assembly 20 is operating in. Finally, a ratchet portion 78 is configured as part of a ratchet assembly 82 (seen in FIG. 1A).

Referring briefly to FIG. 1A and FIG. 1B, the ratchet assembly 82 includes the ratchet portion of the cam 24 (as the gear of the ratchet), a pawl 84 fixed to the caster yoke 14, the pedal 22, one or more pedal torsion springs 21 and a spur gear pusher 86. The spur gear pusher 86 may be mounted on a spur pusher axle 87.

The cam 24 may be configured to rotate about the cam axle 70. A cam bushing 71 may also be used. The ratchet assembly 82 is configured to rotate the cam 24 in a single direction in fixed increments. Each increment corresponds to a different state of the cam assembly 20.

When the pedal 22 is pressed, the spur gear pusher 86 rotates the cam 24 about the cam axle 70 a fixed rotation by pressing against a ratchet gear 88. Operating the pedal 22 engages the ratchet portion 78 to rotate or forces the cam 24 from one state into a next state. For example, if the cam 24 is configured to operate with three states repeated twice, six presses of the pedal 22 are required for an entire revolution of the cam 24. Accordingly, each press of the pedal 22 against the ratchet gear 88 rotates the cam 24 one-sixth of a revolution. The pedal 22 is then moved back into its starting position by the torque exerted by the pedal torsion spring 21. In some embodiments, more than one pedal torsion springs 21 are used.

Once a certain amount of rotation has been achieved by pressing the pedal 22 against the ratchet gear 88, the pawl 84 prevents the ratchet portion 78 of the cam 24 from rotating in the reverse direction by locking the pawl 84 against a different ratchet gear 88 of the ratchet portion 78 of the cam 24. In this manner, the ratchet assembly 82 is able to cycle through the different states of the cam assembly 20 in series through consecutive presses of the pedal 22.

The swivel cam portion 72 is configured to be in mechanical communication with the swivel cam follower 36 of the swivel lever mechanism 26. As the cam 24 rotates about the cam axle 70, the swivel lever mechanism 26 is activated by one or more swivel cam protrusions 90 on the swivel cam portion 72. In the preferred embodiment illustrated in FIG. 7, the cam 24 of the cam assembly 20 is operable in three states repeated twice per revolution of the cam 24. Accordingly, two cam protrusions 90 are illustrated for the swivel cam portion 72.

Similarly, the brake cam portion 74 is configured to be in mechanical communication with the brake cam follower 52. When the cam 24 rotates about the cam axle 70, the brake cam follower 52 is activated by one or more brake cam protrusions 92 on the brake cam portion 74. As with the swivel cam portion 72, two cam protrusions 92 are illustrated for the brake cam portion 74.

As seen in FIG. 7, the swivel cam protrusions 90 and the brake cam protrusions 92 are offset from one another. Accordingly, the cam 24 is configured to allocate when the different states of the cam assembly 20 are activated or engaged by placing the protrusions 90, 92 of the swivel cam portion 72 and brake cam portion 74 at different locations during the rotation of the cam 24. In the preferred embodiment illustrated by the cam 24 of FIG. 7, the cam is operable in three states repeated twice per revolution of the cam 24. Accordingly, FIG. 7 illustrates two instances per revolution of the cam 24 where neither the swivel lever mechanism 26 nor the brake lever mechanism 30 are activated by either the swivel cam protrusions 90 or the brake cam protrusions 92; two instances per revolution of the cam 24 where the swivel lever mechanism 26 is engaged by the swivel cam protrusions 90 and two instances per revolution of the cam 24 where the brake lever mechanism 30 is engaged by the brake cam protrusions 92.

The cam 24 may also include an indicator portion 76. The indicator portion 76 is configured to provide an indication of what state the caster assembly 10 is operating in. This may improve user convenience as the user can quickly ascertain if the state of the caster assembly 10 needs to be changed without requiring the user to try and move the object to which the caster assembly 10 is attached. In a preferred embodiment, the indicator portion 76 includes an indicia 80 to provide a quick visual indication. For example, a colour may be used such as green, yellow, red and the like for the different states of the cam assembly 20. In alternate embodiments, various graphical shapes or visual characters may be used.

In a preferred embodiment, the swivel lever mechanism 26 and brake lever mechanism 30 are layered on top of each other as seen in FIG. 1C. As the pair of swivel lever pivots 42 are generally disposed under the plane of the swivel lever mechanism 26 and the pair of brake lever pivots 58 are generally disposed above the plane of the brake lever mechanism 30, the swivel lever mechanism 26 and the brake lever mechanism 30 are configured to pivot about the same common axle 23 without interfering with each other. As seen in the underside view of FIG. 1C, the brake lever mechanism 30 is disposed underneath the swivel lever mechanism 26.

As described previously, in order for the brake lever mechanism 30 to maintain contact with the brake cam portion 74 of the cam 24, the brake spring finger 56 is biased against the underside of the caster yoke 14, such as the base plate 13 of the caster yoke 14. As the swivel lever mechanism 26 is disposed between the brake lever mechanism 30 and the base plate 13 of the caster yoke 14 in the preferred embodiment, the access aperture 44 of the swivel lever mechanism 26 is configured to allow the brake spring finger 56 of the brake lever mechanism 30 to pass through the swivel lever mechanism 26 and maintain contact with the base plate 13 of the caster yoke. Furthermore, as seen in FIG. 1C, the common axle 23 is passed through the brake finger gap 61 formed by the upper portion 57 and end portion 59 of the brake spring finger 56. In this manner, both the swivel spring finger 40 and the brake spring finger 56 are in mechanical contact with the base plate 13 of the caster yoke 14 to maintain a bias against the caster yoke 14 such that their respective cam followers 36, 52 are in mechanical contact with their respective cam portions 72, 74, at all times.

Although the brake lever mechanism 30 is disposed below the swivel lever mechanism 26 when assembled in the caster assembly 10 in the preferred embodiment, this should not be construed as limiting. In alternate embodiments, the swivel lever mechanism 26 may be disposed below the brake lever mechanism 30, with the appropriate modifications to the pairs of lever pivots 42, 58, spring fingers 40, 56, access aperture 44, retainers 28, 32, and the like.

Figure 10:
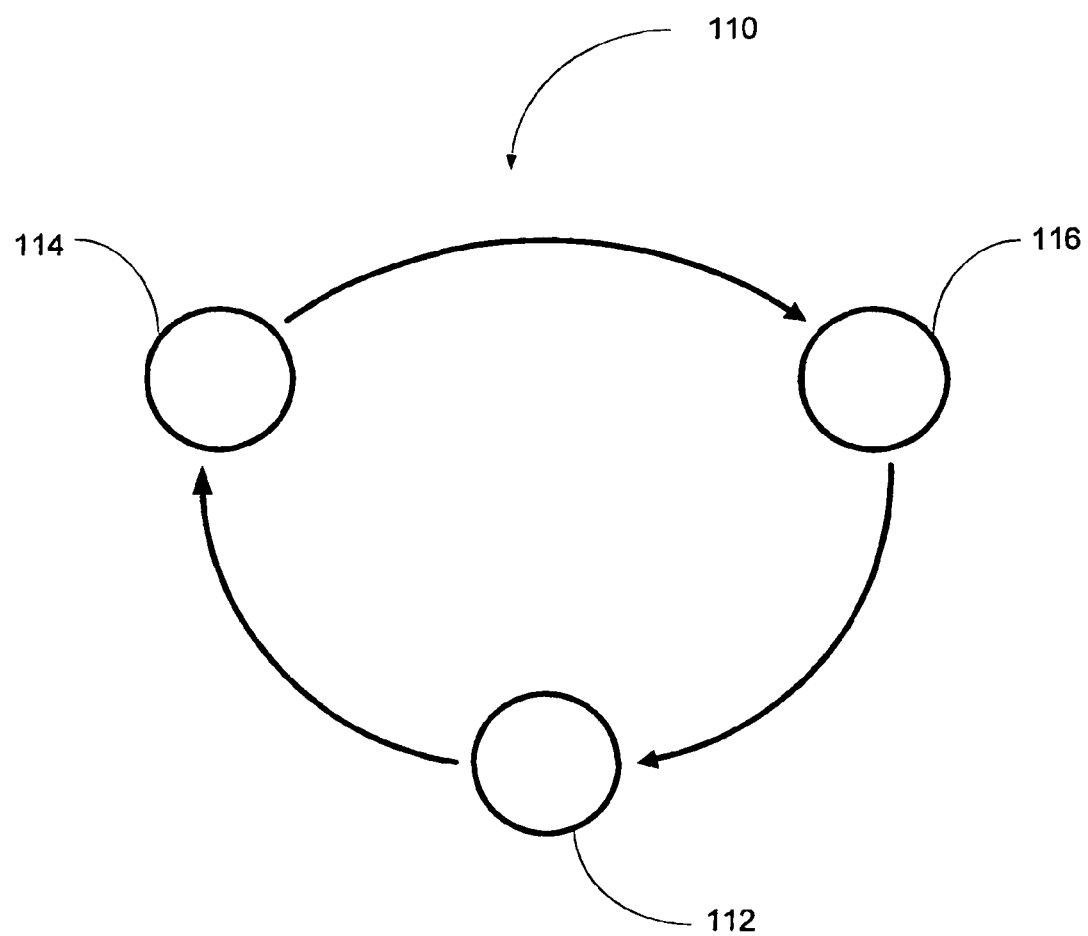
FIG. 10 shows a state diagram of the different states of a caster assembly in accordance with an embodiment of the present invention.

Referring now to FIG. 10, a state diagram 110 is used to illustrate how the pedal 22 is used to change the state 112, 114, 116 of the cam assembly 20. Each push of the pedal 22, forces the cam assembly 20 into the next state. When the cam assembly 20 is in a first state 112, the wheel 16 is operable to rotate freely about the wheel axis 18 and the caster yoke 14 is operable to swivel freely relative to the top plate 12. When in the cam assembly 20 is in a second state 114, the cam 24 disposes the swivel lever mechanism 26 such that a first swivel brake 38 is engaged to lock the caster yoke 14 in a predetermined orientation relative to the top plate 12 while the wheel 16 is allowed to rotate freely about the wheel axis 18. Finally, when the cam assembly 20 is in a third state 116, the cam 24 disposes the brake lever mechanism 30 such that, simultaneously, a wheel brake 60 is engaged to stop the wheel 16 from rotating freely about the wheel axis 18 and a second swivel brake 54 is engaged to stop the caster yoke 14 from swivelling relative to the top plate 12.

In a preferred embodiment, the cam assembly 20 is operable to repeat or loop the transitions from one state 112, 114, 116 to another state 114, 116, 112, indefinitely. Furthermore, although shown in a specific order in FIG. 10, it should be understood that any order or pattern of states may be used by the cam assembly 20. In some embodiments, a specific state 112, 114, 116 may occur more or less frequently than the other states 112, 114, 116. The order depicted the state diagram 110 shown in FIG. 10 and discussed in the preferred embodiments should not be construed as limiting.

Finally, the cam assembly 20 may be operated in any number of different states or different modes of operation. In a preferred embodiment, the cam assembly 20 is configured for three states 112, 114, 116. However, it should be understood that more states are possible.

Figure 8:
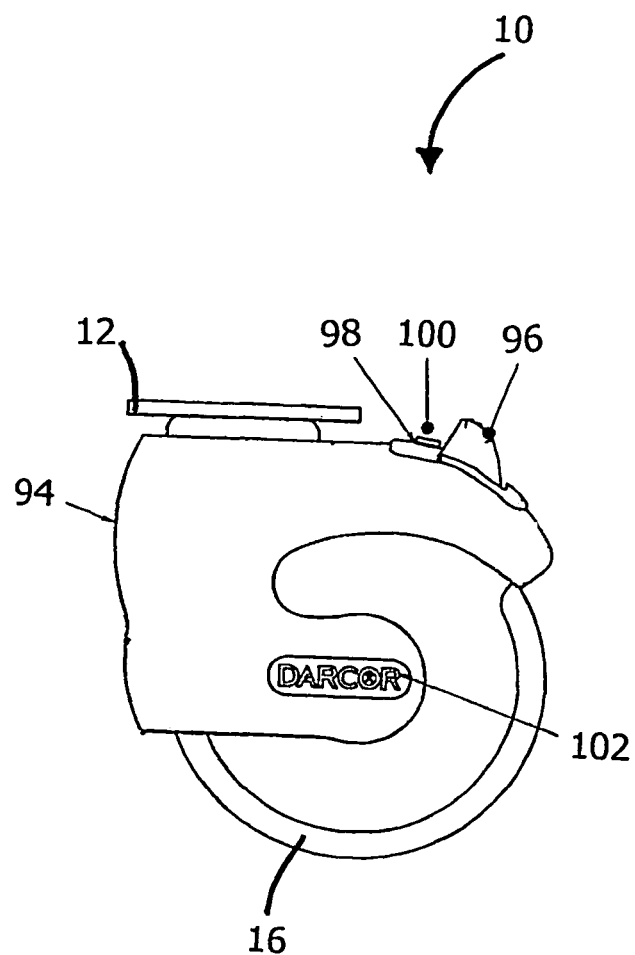
FIG. 8 shows a side view of the caster assembly shown in FIG. 1A with protective covers over parts of the caster assembly.

Referring now to FIG. 8, the caster assembly 10 is shown with protective coverings in accordance with an embodiment of the present invention. The caster yoke 14 is covered by a caster casing 94. Furthermore, the pedal 22 is covered by a pedal cover 96 and the cam is covered by a cam casing 98. The caster casing 94 may have a caster casing logo panel 102. For example, the caster casing 94 shown in FIG. 8 includes a caster casing logo panel 102 engraved with "DARCOR" (trade-marked), indicating the source of the caster assembly 10.

A cam casing indicator window 100 may be coupled to the cam casing 98 to allow the user to view the indicia 80 on the indicator portion 76 of the cam 24, indicating the state of the cam assembly 20.

Figure 9:
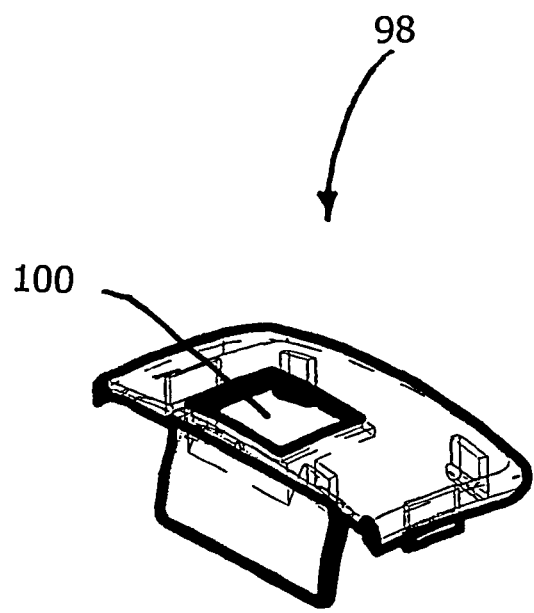
FIG. 9 shows an isometric view of an indicator window in accordance with an embodiment of the present invention.

Referring now to FIG. 9, a cam casing 98 is shown having a cam casing indicator window 100. The cam casing indicator window 100 may be constructed out of a transparent material (such as glass or plastic) to allow the indicia 80 to be viewable when the indicia 80 is constructed as part of the indicator portion 76 of the cam 24. Furthermore, the cam casing indicator window 100 may be configured as a magnifier to improve or increase the prominence of the indicia 80. Referring briefly to FIG. 7, the indicia 80 in a preferred embodiment is a colour associated with a specific state (such as green for a first state, yellow for a second state and red for a third state). When the cam casing indicator window 100 of the cam casing 98 is placed over the cam 24 of the cam assembly 20, the colour indicating the state of the cam assembly 20 may be easily discernible through the cam casing indicator window 100.

Figure 11B:
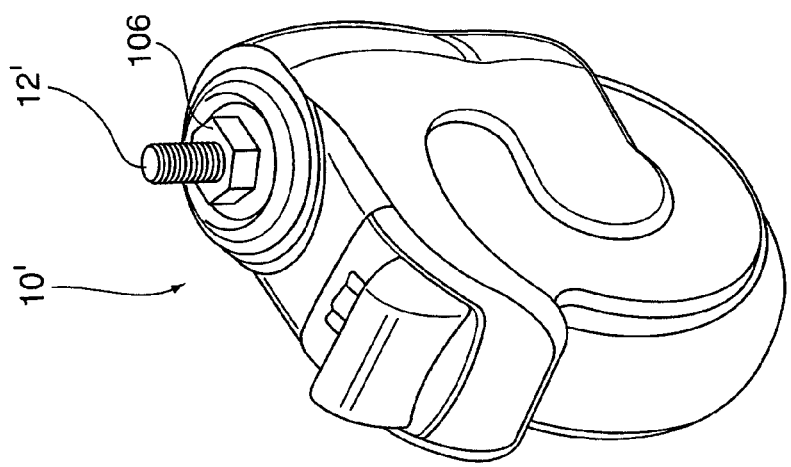
FIG. 11B shows an isometric view of the caster assembly with protective covers over parts of the caster assembly in accordance with another embodiment of the present invention.
Figure 11A:
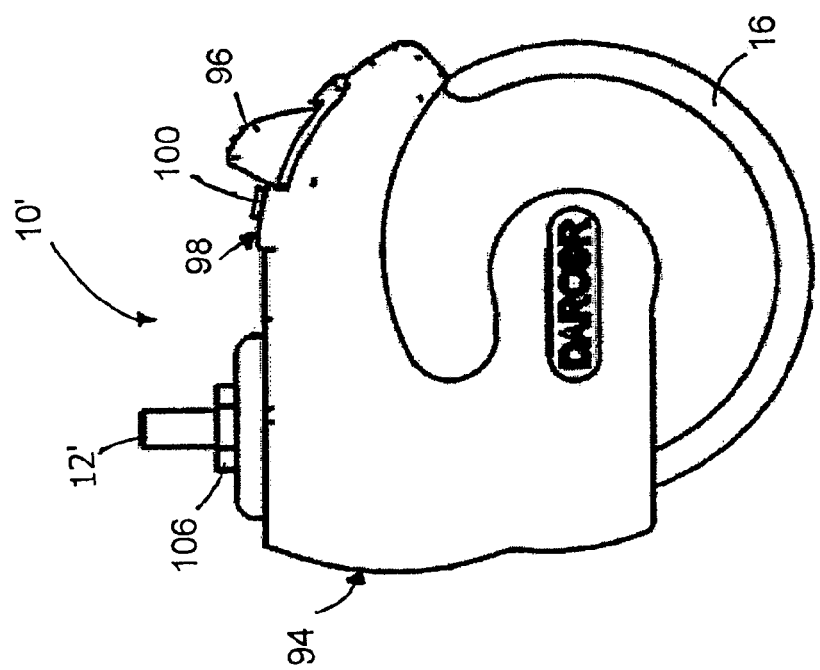
FIG. 11A shows a side view of a caster assembly with protective covers over parts of the caster assembly in accordance with another embodiment of the present invention.

Reference is now made to FIG. 11A and FIG. 11B which illustrates a caster assembly 10' in another preferred embodiment. Instead of a top plate 12, as illustrated in FIG. 1A and FIG. 8, an alternative attachment means 12' is used for attaching the caster assembly 10' to the base of the object (not shown). For example, in another preferred embodiment, the attachment means 12' is configured as a stem bolt (hereinafter referred to as stem bolt 12') and a stem bolt nut 106. A caster assembly 10' configured with a stem bolt 12' and stem bolt nut 106 may require fewer components and materials, thereby reducing costs.

The caster assembly 10' is operable in a manner similar to the preferred embodiments illustrated in FIG. 1A and FIG. 8, and discussed above. As seen in FIG. 11A, the caster assembly 10' is configured with a caster casing 94, pedal cover 96, cam casing 98 and cam casing indicator window 100. Furthermore, the caster yoke 14 (not shown) under the caster casing 94 is operable to rotate about the attachment means now configured as the stem bolt 12' and stem bolt nut 106.

The stem bolt 12' and the stem bolt nut 106 may be used to attach the caster assembly 10' to the base of the object (not shown). Furthermore, any number of alignment means or mechanisms may be used to ensure that the caster assembly 10' is properly aligned and attached to the object.

Referring briefly to the caster assembly 10 illustrated in cross-section in FIG. 1E, the king bolt 34 is mechanically coupled to the top plate 12 using the king bolt nut 33. As seen in FIG. 1E, the king bolt 34 may be a separate component than the top plate 12. However, this is not required, as the king bolt 34 may form a single piece with the top plate 12.

In contrast, in the caster assembly 10' seen in FIG. 11A and FIG. 11B, the king bolt 34' is mechanically coupled to the attachment means defined by the stem bolt 12'. The king bolt 34' may be mechanically coupled to the stem bolt 12' by any number of means. For example, the king bolt 34' may be welded, glued, fastened, or otherwise attached to the stem bolt 12'. Other coupling means are also possible such as forming, pressing or casting the king bolt 34' and the stem bolt 12' out of a single piece of material. The remainder of the caster assembly 10' may behave similarly to the caster assembly 10, described above.

Figure 12:
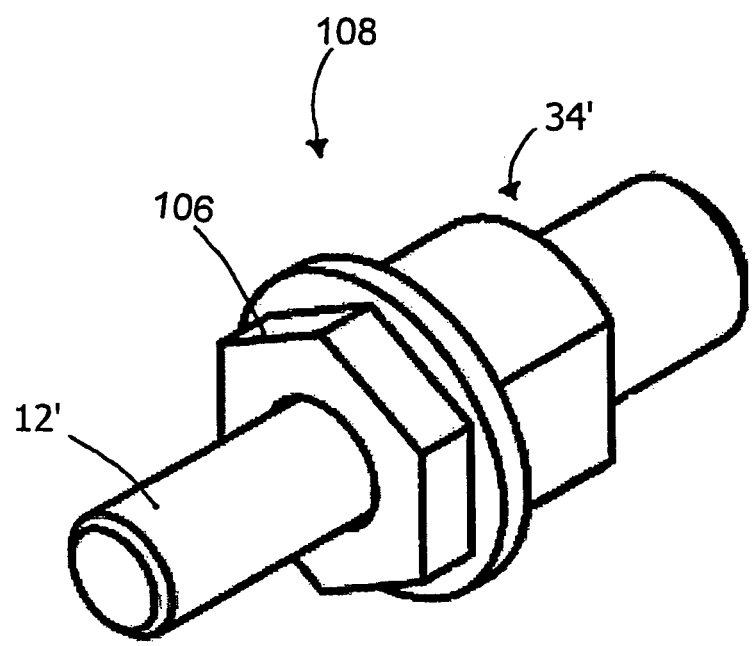
FIG. 12 shows a multi-stem/king bolt in accordance with another embodiment of the present invention.

FIG. 12 shows a multi-stem/king bolt 108 in accordance with an embodiment of the present invention to be used with the caster assembly 10' illustrated in FIG. 11A and FIG. 11B. In a preferred embodiment, the multi-stem/king bolt 108 may be formed as a single piece to include both the stem bolt 12' and the king bolt 34'. For example, the multi-stem/king bolt 108 may be molded, cast, milled, and the like out of any suitable material to include both the stem bolt 12' and the king bolt 34'. In this manner, the multi-stem/king bolt 108 forms both the attachment means (i.e. stem bolt 12') for attaching the caster assembly 10' to the base of the object (not shown) and the king bolt 34' for coupling the caster yoke 14 to the attachment means.

As previously described in a preferred embodiment, the king bolt 34 is mechanically coupled to the caster yoke 14 (seen in FIG. 1E) such that the caster yoke 14 is operable to swivel about the king bolt 34. In this manner, the caster yoke 14 is also operable to swivel relative to the attachment means (i.e. top plate 12), which is fixed to the king bolt 34. As the stem bolt 12' is formed with the king bolt 34' as part of the multi-king/stem bolt 108, the caster yoke 14 is also operable to swivel relative to the stem bolt 12' (i.e. attachment means) in the caster assembly 10' illustrated in FIG. 11A and FIG. 11B.

Although now attached to the attachment means, the portion of the multi-stem/king bolt 108 comprising the king bolt 34' is configured to operate as the king bolt 34, described above. For example, the portion of the multi-stem/king bolt 108 comprising the king bolt 34' is still fixed relative to the swivel lock retainer 28 and the brake swivel retainer 32 by the portion of the multi-stem/king bolt 108 comprising the king bolt 34' and the king bolt nut 33.

In another embodiment, a caster system (not shown) may be configured with a plurality of caster assemblies 10, as described above. For example, an object may have four caster assemblies 10 attached to its base. In one embodiment, each of the casters assemblies 10 may have a separate actuating means 22 for operating the respective cam assemblies 20.

In another embodiment, a single actuator may be used to actuate the actuating means 22 of each of the four caster assemblies 10 at the same time or in a single action. For example, the single actuator may be a button or a pedal located at a convenient position on the object to which the caster assemblies 10 are attached.

The single actuator may be mechanically coupled to the actuating means 22 of each of the four caster assemblies 10. For example, linkages may be used to provide mechanical communication between the single actuator and each of the actuating means 22. In this manner, activation of the single actuator may communicate this action and force each of the caster assemblies 10 into the next state by actuating the actuating means 22 of each of the caster assemblies 10 at the same time or in the same motion. It should be understood that different configuration of linkages, including linkages with different types of joints, number of bars, and degrees of freedom, may be used. Furthermore, other coupling means are also possible.

In another embodiment, the single actuator may be electronically coupled to the actuating means 22 of each of the four caster assemblies 10. For example, the actuating means 22 of each of caster assemblies 10 may be an electromechanical device, such as a solenoid. If so, the single actuator in the caster system may be electrically coupled to the actuating means 22 of each of the caster assemblies 10 and the single actuator may provide an electrical signal to actuate each of the actuating means 22.

Although this disclosure has described and illustrated certain preferred embodiments of the invention, it is also to be understood that the invention is not restricted to these particular embodiments rather, the invention includes all embodiments which are functional, or mechanical equivalents of the specific embodiments and features that have been described and illustrated herein.

Furthermore, it should be understood that the described components may be constructed using standard manufacturing processes. For example, the top plate 12, caster yoke 14, pedal 22, and the like may be constructed using known stamping, milling and metal processing techniques. Furthermore, the metal and other components used to construct the caster assemblies may incorporate known techniques to improve the strength, resilience or hardness of the material such as various forms of annealing, stamping and the like. Other forms of manufacturing and construction may be used in the construction of the caster assemblies. The methods referred to in the preferred embodiments should not be construed as limiting.

It will be understood that, although various features of the invention have been described with respect to one or another of the embodiments of the invention, the various features and embodiments of the invention may be combined or used in conjunction with other features and embodiments of the invention as described and illustrated herein.

The embodiments of the invention in which an exclusive property or privilege is claimed is defined as follows:

1. A caster assembly comprising:
   an attachment means for attaching the caster assembly to a base of an object;
   a caster yoke coupled to the attachment means,
      wherein the caster yoke is operable to swivel relative to the attachment means, and
      wherein the caster yoke is coupled to a wheel operable to rotate freely about a wheel axle;
   a first swivel brake coupled to the caster yoke;
   a second swivel brake coupled to the caster yoke;
   a wheel brake coupled to the caster yoke; and
   a cam assembly operable in at least three states, wherein the cam assembly is coupled to the caster yoke, the cam assembly comprising:
      an actuating means for operating the cam assembly,
      a cam in mechanical communication with the actuating means, wherein the actuating means positions the cam to force the cam assembly into each of the at least three states, and wherein the cam rotates about a cam axle and the cam is segmented into a plurality of longitudinal portions, the longitudinal portions comprising:
         a swivel cam portion for engaging the swivel lever mechanism; and
         a brake cam portion for engaging the brake lever mechanism;
      a swivel lever mechanism in mechanical communication with the cam, and
      a brake lever mechanism in mechanical communication with the cam;

wherein when the cam assembly is in a first state, the wheel is operable to rotate freely about the wheel axis and the caster yoke is operable to swivel freely relative to the attachment means;

wherein when the cam assembly is in a second state, the cam disposes the swivel lever mechanism such that the first swivel brake is engaged to lock the caster yoke in a predetermined orientation relative to the attachment means while the wheel is allowed to rotate freely; and wherein when the cam assembly is in a third state, the cam disposes the brake lever mechanism such that, simultaneously, the wheel brake is engaged to stop the wheel from rotating freely about the wheel axis and the second swivel brake is engaged to stop the caster yoke from swivelling relative to the attachment means.

2. The caster assembly of claim 1, wherein the caster yoke is coupled to the attachment means by a king bolt,
wherein the king bolt is mechanically coupled to the attachment means, and
wherein the caster yoke swivels about the king bolt.

3. The caster assembly of claim 1,
wherein the plurality of longitudinal portions of the cam further comprises an indicator portion for providing an indicia of which of the at least three states the cam assembly is operating in.

4. The caster assembly of claim 3, wherein the caster assembly further comprises an indicator window for displaying the indicia of which of the at least three states the cam assembly is operating in.

5. The caster assembly of claim 1, wherein the plurality of longitudinal portions of the cam further comprises a ratchet cam portion and the cam assembly further comprises a ratchet assembly in mechanical communication with the cam,
wherein the ratchet cam portion is in mechanical communication with the ratchet assembly,
wherein the cam assembly is rotated through each of the at least three states by operating the actuating means in combination with the cam and the ratchet assembly, and
wherein operating the actuating means engages the ratchet cam portion to rotate the cam from one of the at least three states into a next state.

6. The caster assembly of claim 5, wherein the ratchet cam portion comprises six sides such that each of the first state, the second state, and the third state is entered into twice during each revolution of the cam and the ratchet assembly rotates the cam into the next state during each operation of the actuating means.

7. The caster assembly of claim 1, wherein the caster assembly further comprises:
a swivel lock retainer mechanically coupled to the attachment means, wherein the swivel lock retainer is operable to cooperatively mate with the first swivel brake to lock the caster yoke in the predetermined orientation relative to the attachment means, when the cam assembly is in the second state.

8. The caster assembly of claim 7, wherein the predetermined orientation for the caster assembly aligns the caster yoke with the attachment means such that the object attached to the attachment means is enabled to roll forward or backward.

9. The caster assembly of claim 7, wherein the caster assembly further comprises:
a brake swivel retainer mechanically coupled to the attachment means, wherein the brake swivel retainer is operable to cooperatively mate with the second swivel brake to stop the caster yoke from swivelling relative to the attachment means, when the cam assembly is in the third state.

10. The caster assembly of claim 9, wherein the brake swivel retainer and the swivel lock retainer are stacked.

11. The caster assembly of claim 10,
wherein the swivel lever mechanism comprises a swivel spring finger to bias the swivel lever mechanism such that the swivel lever mechanism maintains mechanical communication with the cam; and
wherein the brake lever mechanism comprises a brake spring finger to bias the brake lever mechanism such that the brake lever mechanism maintains mechanical communication with the cam.

12. The caster assembly of claim 9,
wherein the swivel lever mechanism and the brake lever mechanism are disposed within the caster yoke and pivot about a common axle; and
wherein the swivel lever mechanism is layered above or below the brake lever mechanism.

13. The caster assembly of claim 12, wherein the swivel lever mechanism is layered above the brake lever mechanism within the caster yoke and the swivel lever mechanism further comprises:
an access aperture for the brake spring finger to pass through the swivel lever mechanism such that the brake spring finger is operable to bias the brake lever mechanism.

14. The caster assembly of claim 12, wherein the brake lever mechanism is layered above the swivel lever mechanism within the caster yoke and the brake lever mechanism further comprises:
an access aperture for the swivel spring finger to pass through the brake lever mechanism such that the swivel spring finger is operable to bias the swivel lever mechanism.

15. The caster assembly of any one of claims 1 to 14, wherein the attachment means is a top plate.

16. The caster assembly of any one of claims 1 to 14, wherein the attachment means is a stem bolt.

17. The caster assembly of any one of claims 1 to 14, wherein the actuating means is a pedal.

18. A caster system comprising a plurality of the caster assemblies according to any one of claims 1 to 14.

19. The caster system of claim 18, wherein the actuating means for each of the plurality of caster assemblies is actuated by a single actuator in a single action.

20. The caster system of claim 19, wherein the single actuator is a single pedal.

21. A caster assembly comprising:
an attachment means for attaching the caster assembly to a base of an object;
a swivel lock retainer mechanically coupled to the attachment means;
a brake swivel retainer mechanically coupled to the attachment means;
a caster yoke coupled to the attachment means,
wherein the caster yoke is operable to swivel relative to the attachment means, and
wherein the caster yoke is coupled to a wheel operable to rotate freely about a wheel axle;
a first swivel brake coupled to the caster yoke;
a second swivel brake coupled to the caster yoke;
a wheel brake coupled to the caster yoke;
a cam assembly operable in at least three states, wherein the cam assembly is coupled to the caster yoke, the cam assembly comprising:

an actuating means for operating the cam assembly, a cam in mechanical communication with the actuating means, wherein the actuating means positions the cam to force the cam assembly into each of the at least three states, a swivel lever mechanism in mechanical communication with the cam, and a brake lever mechanism in mechanical communication with the cam;

wherein when the cam assembly is in a first state, the wheel is operable to rotate freely about the wheel axis and the caster yoke is operable to swivel freely relative to the attachment means;

wherein when the cam assembly is in a second state, the cam disposes the swivel lever mechanism such that the first swivel brake is cooperatively mated with the swivel lock retainer to lock the caster yoke in a predetermined orientation relative to the attachment means while the wheel is allowed to rotate freely;

wherein when the cam assembly is in a third state, the cam disposes the brake lever mechanism such that, simultaneously, the wheel brake is engaged to stop the wheel from rotating freely about the wheel axis and the second swivel brake is cooperatively mated with the brake swivel retainer to stop the caster yoke from swivelling relative to the attachment means.

* * * * *